(12) United States Patent
Jones et al.

(10) Patent No.: US 7,618,071 B2
(45) Date of Patent: *Nov. 17, 2009

(54) INTEGRAL RESTRAINT SYSTEM AND METHOD OF MANUFACTURE FOR PLASTIC PIPE

(75) Inventors: Jim Jones, Aledo, TX (US); Bradford G. Corbett, Jr., Ft. Worth, TX (US)

(73) Assignee: S & B Technical Products, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/544,840

(22) Filed: Oct. 6, 2006

(65) Prior Publication Data

US 2007/0063516 A1 Mar. 22, 2007

Related U.S. Application Data

(62) Division of application No. 10/770,944, filed on Feb. 3, 2004, now Pat. No. 7,134,204.

(60) Provisional application No. 60/498,194, filed on Aug. 25, 2003, provisional application No. 60/501,508, filed on Sep. 9, 2003, provisional application No. 60/506,073, filed on Sep. 24, 2003, provisional application No. 60/506,791, filed on Sep. 29, 2003.

(51) Int. Cl.
*F16L 19/06* (2006.01)

(52) U.S. Cl. ...................... 285/343; 285/307

(58) Field of Classification Search .................. 285/306, 285/307, 332, 332.1, 332.2, 343
See application file for complete search history.

(56) References Cited

U.S. PATENT DOCUMENTS

| | | | | | |
|---|---|---|---|---|---|
| 3,815,940 | A | * | 6/1974 | Luckenbill | 285/105 |
| 4,030,872 | A | * | 6/1977 | Parmann | 425/393 |
| 4,120,521 | A | * | 10/1978 | Parmann | 285/113 |
| 4,130,302 | A | * | 12/1978 | Mitchell et al. | 285/113 |
| 4,818,209 | A | * | 4/1989 | Petersson et al. | 425/392 |
| 5,601,776 | A | * | 2/1997 | Tuominen | 264/516 |
| 5,988,695 | A | * | 11/1999 | Corbett, Jr. | 285/110 |
| 6,142,484 | A | * | 11/2000 | Valls, Jr. | 277/602 |
| 6,328,309 | B1 | * | 12/2001 | Corbett, Jr. | 277/314 |
| 6,488,319 | B2 | * | 12/2002 | Jones | 285/374 |
| 6,502,867 | B2 | * | 1/2003 | Holmes et al. | 285/337 |
| 7,134,204 | B2 | * | 11/2006 | Corbett et al. | 29/890.14 |
| 7,284,310 | B2 | * | 10/2007 | Jones et al. | 285/374 |

* cited by examiner

*Primary Examiner*—David E Bochna
(74) *Attorney, Agent, or Firm*—Charles D. Gunter, Jr.

(57) ABSTRACT

A method and apparatus for restraining pipe against internal forces at a pipe or fitting connection and to join and seal at least two pipes to form a pipeline is shown featuring an improved restraining/sealing mechanism. The restraining/sealing mechanism includes a relatively rigid gripper ring and a companion sealing ring which are received within one or more mating grooves provided in the belled end of a female pipe. The gripper ring and sealing ring can be combined or attached, or they can be separate members located in the same retaining groove or separate grooves in the female belled pipe end.

4 Claims, 7 Drawing Sheets

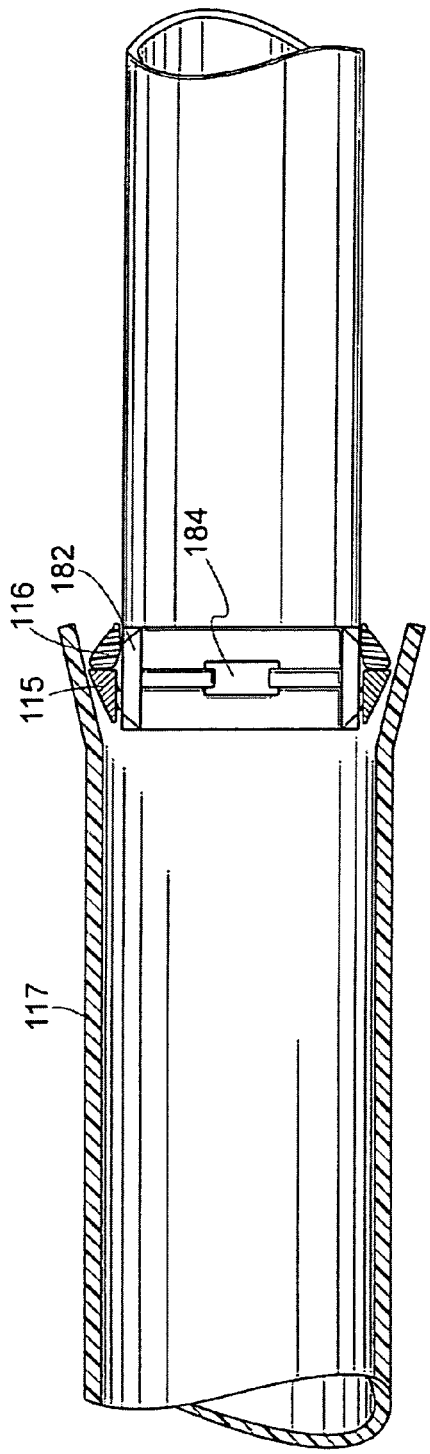
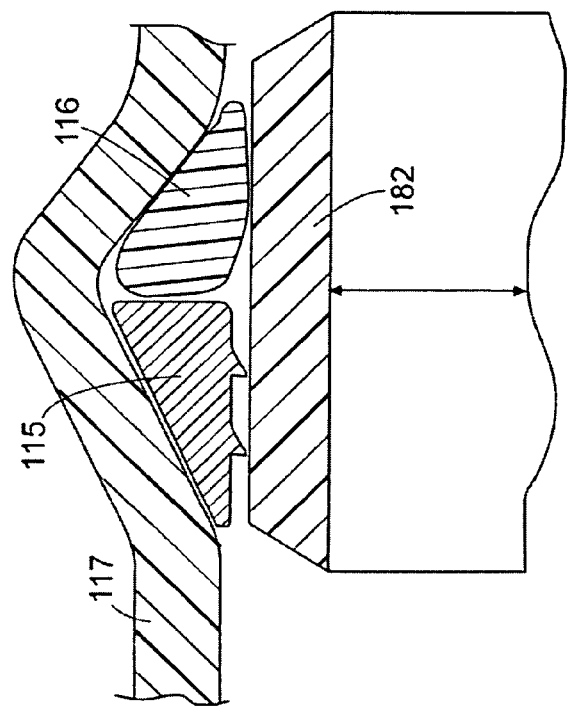

INTEGRAL RESTRAINT SYSTEM AND METHOD OF MANUFACTURE FOR PLASTIC PIPE

CROSS-REFERENCE TO RELATED APPLICATIONS

The present application is a divisional application of prior Ser. No. 10/770,944, filed Feb. 3, 2004, now issued U.S. Pat. No. 7,134,204, issued Nov. 14, 2006, and claims priority from the following U.S. Provisional Applications: Ser. No. 60/498,194, filed Aug. 25, 2003, entitled "Restrained Ring Joint For Plastic Pipe", by Bradford G. Corbett, Jr.; Ser. No. 60/501,508, filed Sep. 9, 2003, entitled "Reiber Style Self Restraining Gasket For Plastic Pipe", by Bradford G. Corbett, Jr.; Ser. No. 60/506,073, filed Sep. 24, 2003, entitled "Rieber Style Self Restraining Gasket For Plastic Pipe", by Bradford G. Corbett, Jr. and Jim Jones; and Ser. No. 60/506,791, filed Sep. 29, 2003, entitled "Integral Bell Pipe-to Pipe Restraint System For Plastic Pipe", by Bradford G. Corbett, Jr. and Jim Jones.

BACKGROUND OF THE INVENTION

1. Field of the Invention

The present invention relates generally to the field of pipe connections, and in particular, to a dual function, self restraining sealing system that is used to form a secure pipe connection between two plastic pipes and to a method of manufacturing the same.

2. Description of the Related Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

It is well known in the art to extrude plastic pipes in an elongated cylindrical configuration of a desired diameter and to then cut the extruded product into individual lengths of convenient size suitable for handling, shipping and installing. Each length of pipe is enlarged or "belled" at one end sufficiently to join the next adjacent pipe section by receiving in the female, belled end the unenlarged or "spigot" male end of the next adjacent length of pipe. The inside diameter of the bell is formed sufficiently large to receive the spigot end of the next section of pipe with sufficient clearance to allow the application of packing, caulking, elastomeric gaskets or other sealing devices designed to prevent leakage at pipe joints when a plurality of pipe lengths are joined to form a pipeline.

During a standard installation of a pipeline, in, for example, municipal installations, the joints between pipes and between pipes and fittings must be restrained to accommodate varying pressures as well as environmental influences. For example, there are various types of fitting connections which are commercially available and which are used in, for example, the waterworks industry. In one type of connection, the current restraint mechanism is an external clamping device which is totally separated from the sealing function. Thus, a separate mechanism must perform the sealing function. In another type of fitting connection, a gasket performs the sealing function. However, it is necessary that an external means must compress the gasket by mechanical action such as T-bolts. Most current restraining systems offered in the industry require a substantial amount of labor to install. Under most installation conditions, the restraining systems are cumbersome to install and represent a substantial additional effort for the contractor. As a result, these and other traditional restraining mechanisms of the prior art add considerable cost and complexity to the pipe installation as well as adding the possibility of human error depending upon the specific field conditions and applications.

Accordingly, there is a need for a cost-effective, easy to manufacture and use restraint system for restraining and sealing plastic pipe against internal and external forces at a pipe or fitting connection and for joining and sealing at least two plastic pipes at a pipe joint to form a pipeline.

There also exists a need for such a sealing and restraint system in which the restraint mechanism is integral to the groove formed in the bell end opening of a female pipe member which member receives a mating male, spigot pipe end to form a pipe joint in a fluid conveying pipeline.

SUMMARY OF THE INVENTION

It is therefore an object of the present invention to provide a sealing and restraint system in which the restraint mechanism is integral to the groove formed in the bell end opening of a female pipe member which member receives a mating male, spigot pipe end. The restraining mechanism may be provided as a part of a "gasket formed" bell groove, as in a "Rieber" style pipe belling operation where the groove is simultaneously formed as the bell pipe end is formed. Alternatively, in another embodiment, the restraining mechanism may be provided as a part of a "mechanically formed" bell groove in which the bell groove is formed beforehand at a manufacturing plant on a mandrel and the restraining mechanism is thereafter inserted into the bell groove, for example, at a field location.

It is a preferred object of the invention to provide an improved restraint system for plastic pipe joints utilizing the "gasket formed" bell groove, which does not require assembly in the field and which thus simplifies installation of pipe sections at the pipe joints used to form a fluid conveying pipeline, thereby reducing the chance of human error or of damage or contamination of the gasket sealing surfaces.

Another object is to eliminate the need for an external clamping device of the type presently used in the industry to achieve the restraining function, which device is totally separated from the sealing function.

Another object of the present invention is to provide an improved restraint system for plastic pipe which is simple in design and dependable in operation and which is less costly than the restraining systems presently employing external mechanical restraints.

In the method and apparatus of the invention, an integral bell pipe-to-pipe restraint system is provided for restraining pipe against internal forces at a pipe coupling or fitting connection and for joining and sealing at least two pipes to form a pipeline. The restraint system of the invention utilizes an elastomeric sealing ring in conjunction with some type of cooperating restraint mechanism. The restraint mechanism may be integral with the sealing ring or may be a separate ring. In some cases the restraint mechanism may be individual segments with teeth. In other cases, the restraint mechanism is a single solid ring with one slit in the periphery. The female end of the plastic pipe is preferably belled around the restraining and sealing mechanism so that the restraint system is integral with the bell. In this way, it is not necessary to install the restraint system in the field and, since the system is also locked in position at the factory by means of the belling operation, it is less likely to be dislodged or twisted during assembly of the pipe joint.

In a preferred embodiment of the invention, an integral restraint system for joining and sealing a female, belled pipe end to a mating male spigot pipe end in a plastic pipe system is shown. The restraint system includes a restraining mechanism including both a sealing member and a gripper member, the restraining mechanism being contained within at least one internal groove provided in the female belled pipe end. The female, belled pipe end is formed about the restraining mechanism during manufacture, whereby the restraining mechanism is prelocated within the at least one internal groove. The gripper member can be adhered to the sealing member. Alternatively, the gripper member can be separate from the sealing member. In another embodiment, the sealing member has an elastomeric body and the gripper member is at least partly contained within the body of the sealing member. In another embodiment of the invention, the belled pipe end has two internal grooves and the sealing member is located within one internal groove and the gripper member is located within the other of said internal grooves.

In the preferred embodiment of the invention, the plastic pipe is made of PVC. The preferred materials for the gripper ring include materials selected from the group consisting of metals, composites and rigid elastomers or plastics. The preferred sealing ring is formed from a material selected from the group consisting of natural and synthetic rubbers and elastomers, polymeric plastics and composites.

In one particularly preferred embodiment of the restraint system, the pipe joint includes a restraining mechanism in the form of a relatively rigid gripper ring which is factory installed within a groove formed in a belled end opening of the mating female pipe section. The gripper ring has rows of teeth for engaging the male or spigot pipe end. When a pipe joint is assembled, the teeth engage at various points around the circumference of the mating male section of pipe. This version of the restraint system of the invention also includes a companion sealing ring formed of a resilient sealing material which is received in the same mating groove provided in the belled pipe end of the female pipe section and which is also factory installed. The companion sealing ring can be separate from the gripper ring, or can be attached to or incorporate the gripper ring. The hardened annular gripper ring and companion sealing ring can be installed by using a special type of forming mandrel with the heated pipe end being forced over the gripper and sealing rings and over either a ramp region or over a collapsible element region of the forming mandrel at the factory.

A method of manufacturing the improved restraint system of the invention is also shown. In the method of the invention, a forming mandrel is provided with an inner end and an outer end and having an outer working surface. A restraining mechanism, including a gripping member, is installed at a first circumferential position on the outer working surface. A female end of the plastic pipe is then heated and forced over the working surface of the mandrel and over the restraining mechanism, whereby the heated female end of the plastic pipe flows over the restraining mechanism to form a retention groove for the restraining mechanism. The heated end of the plastic pipe is then cooled to thereby form a belled pipe end. The cooled belled end of the plastic pipe and the retained restraining mechanism are then retracted from the working surface of the mandrel.

The restraining mechanism preferably includes a sealing member with an elastomeric body and a gripper member. The gripper member can be at least partly contained within the elastomeric body of a sealing member or the restraining mechanism can comprise an elastomeric sealing ring and a separate relatively rigid gripper ring located within the groove provided in the belled end opening of the female pipe. In one preferred embodiment of the method of the invention, the sealing ring is intentionally provided with an excess of elastomeric material over and above that which would be necessary for establishing a seal under existing pressure conditions with a mating male pipe to form a pipe coupling, the excess material serving to energize the action of the separate gripper ring in engaging an external surface of the male pipe.

The above as well as additional objectives, features, and advantages of the present invention will become apparent in the following detailed written description.

BRIEF DESCRIPTION OF THE DRAWINGS

FIGS. 12 and 13 are views of another version of the manufacturing method of the invention in which a collapsible mandrel is used to bell the female pipe end.

DETAILED DESCRIPTION OF THE PREFERRED EMBODIMENT

Figure 1:
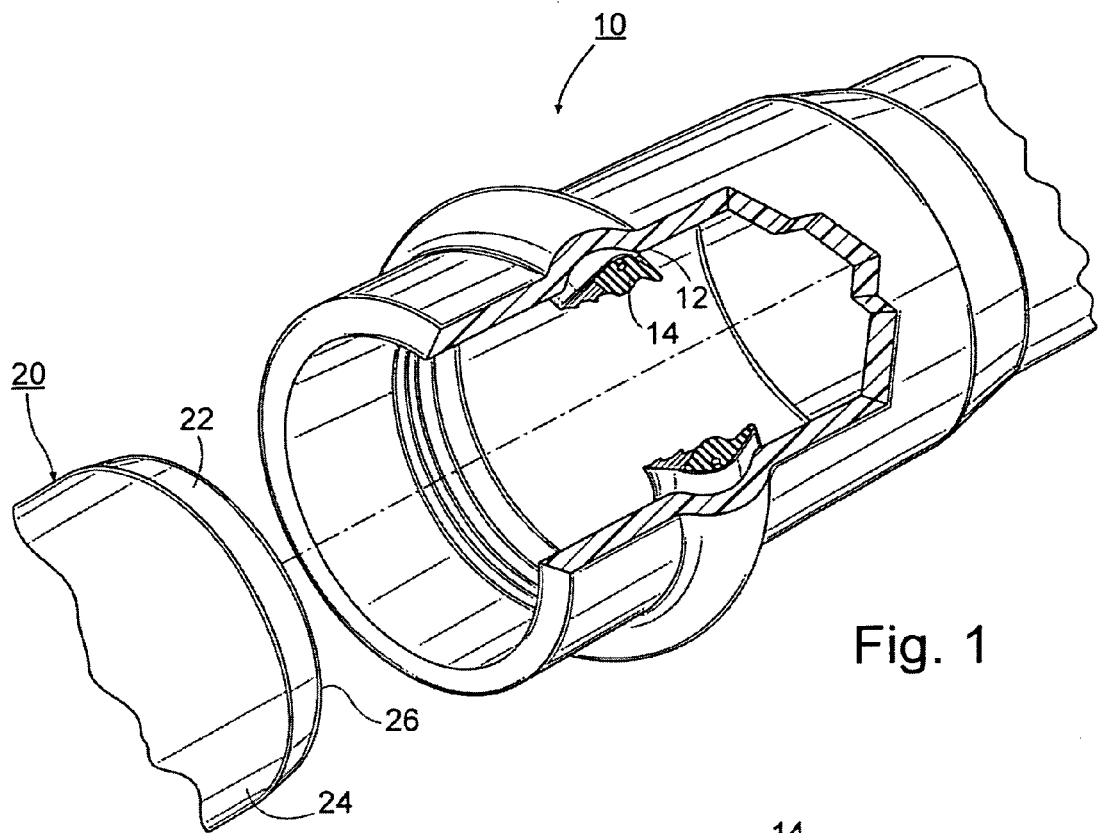
FIG. 1 is a perspective view, partly broken away, of male and female pipe sections about to be made up into a pipe coupling, the belled end of the female pipe section showing one embodiment of the restraining mechanism of the invention in place within a mating groove provided therein.
Figure 2A:
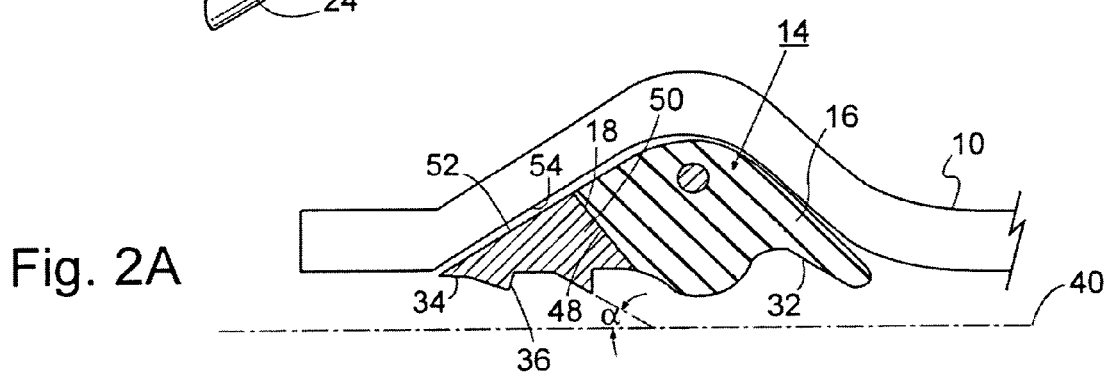
FIG. 2A is a side, cross-sectional view of a portion of the female pipe section showing the gasket of FIG. 1 in greater detail.
Figure 2B:
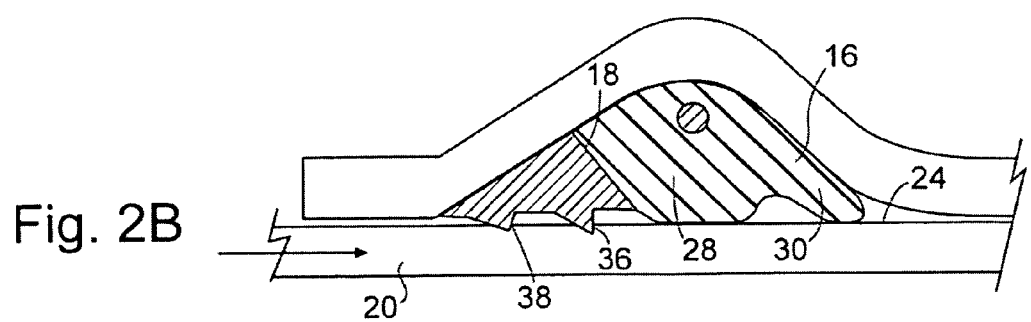
FIG. 2B is a view similar to FIG. 2A, but showing the beginning step of inserting the male pipe section within the female, belled pipe end, the male and female pipe sections being joined to form a secure connection.

Turning to FIG. 1, there is shown an exploded view of a plastic pipe joint in which a belled female pipe end 10 is provided with an annular groove 12 for receiving the restraining mechanism 14 of the invention. As best seen in FIGS. 1, 2A and 2B, the restraining mechanism 14 includes an elastomeric, circumferential sealing portion 16 and a relatively rigid, segmented annular gripper ring portion 18. The improved integral restraining mechanism of the invention is capable of joining and sealing the female plastic pipe 10 to a mating male plastic pipe section 20 having a spigot end 22 and having an exterior surface 24 and an interior surface 26. The plastic pipe male and female ends 10, 20 can be made from any convenient synthetic material including the polyolefins such as polyethylene and polypropylene but is preferably made from polyvinyl chloride (PVC).

As will be apparent from the description which follows, the present manufacturing process uses a variation of the so-called "Rieber" process for plastic pipe manufacture. In the early 1970's, a new technology was developed by Rieber & Son of Bergen, Norway, referred to in the industry as the "Rieber Joint." The Rieber system employed a combined mold element and sealing ring for sealing a joint between the socket end and spigot end of two cooperating pipes formed from thermoplastic materials. In the Rieber process, the elastomeric gasket was installed within a simultaneously formed internal groove in the socket end of the female pipe during the pipe belling process. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,387,992; 3,884,612; and 3,776,682.

While the Rieber process provided an integral sealing gasket which was "prelocated" within the belled, female pipe end in a groove which was formed about the gasket, it did not provide any mechanical "restraining function" to prevent separation of the male and female pipe ends at the pipe connection once the pipe joint was made up.

Figure 3:
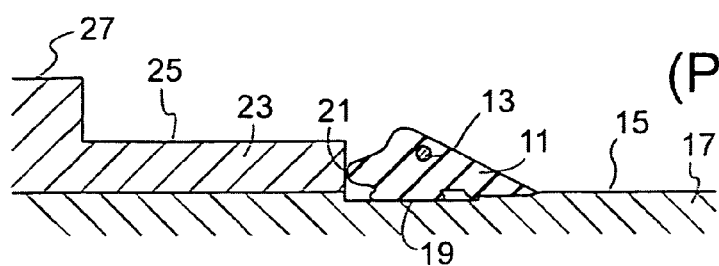
FIGS. 3-6 are simplified, schematic views of the prior art Rieber process used to form the mating groove about the restraining mechanism in the belled female pipe end.
Figure 4:
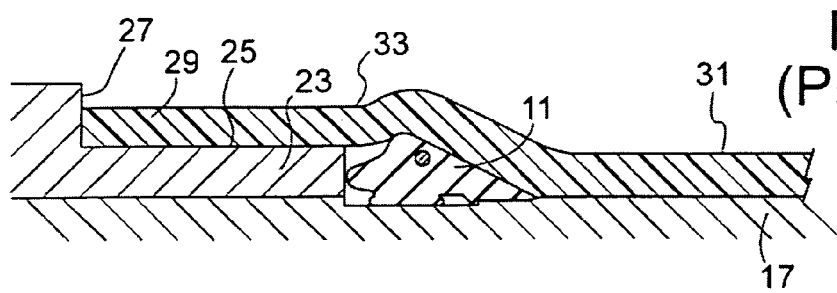
Figure 5:
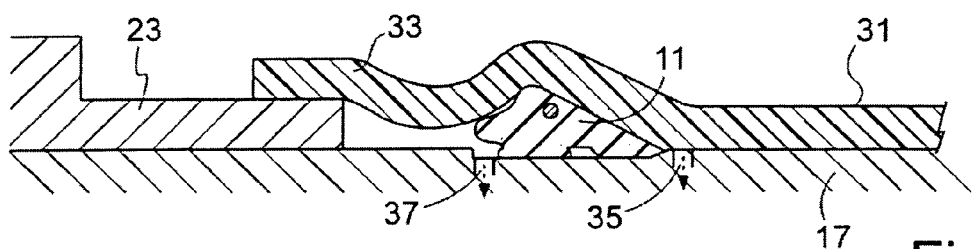
Figure 6:
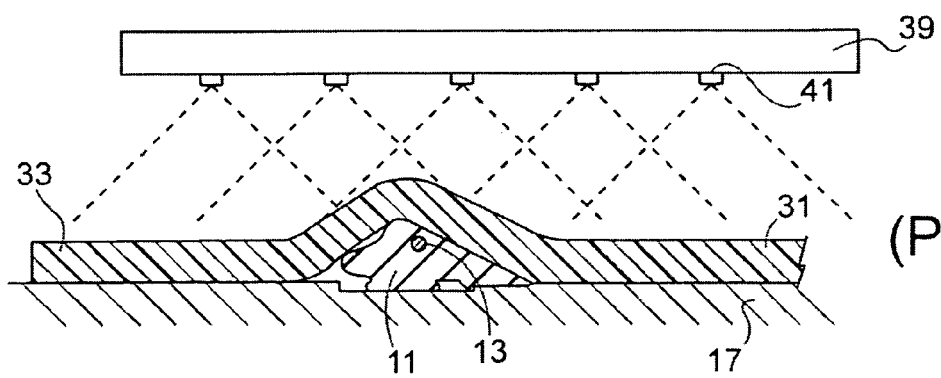

The relevance of the Rieber process to Applicant's invention can perhaps best be appreciated with reference to the description of the prior art process shown in FIGS. 3-6. The prior art process as illustrated. FIG. 3 shows a section of a conventional elastomeric sealing gasket 11 having a steel reinforcing ring 13 in place on the generally cylindrical outer working surface 15 of the mandrel 17 used in the belling process. The elastomeric gasket 11 can be formed of, for example, SBR rubber and is a ring shaped, circumferential member having an inner compression surface 19 and an exposed nose portion 21 which, as shown in FIG. 3, abuts a forming collar 23. The forming collar 23 has a first generally cylindrical extent 25 which is joined to a second cylindrical extent 27 by a step region 29, whereby the second extent 27 is of greater external diameter than the first cylindrical extent 25, shown in FIG. 3.

In the first step of the prior art process, the steel reinforced elastomeric ring 11 is thus placed onto the working surface of the mandrel 17 and pushed to a position against the back-up or forming collar 23. In this position, the gasket is firmly anchored to the mandrel surface with the rubber between the mandrel and the steel-ring of the gasket being compressed by approximately 20%.

In the second step of the prior art process, the socket end 33 of the thermoplastic pipe 31 is heated and pushed over the steel mandrel 17, gasket 11 and back-up collar 23. The socket end 33 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. However, the preferred material for this application is PVC due to its expansion and contraction characteristics. The socket end 33 flows over the first cylindrical extent 25 of the back-up collar 23 and abuts the step region 29 in the second step of the process.

In the next step of the prior art process (FIG. 5) the mandrel and pipe move away from the back-up collar 23 and the pipe socket end 33 retracts around the mandrel and gasket 11 due to the elastic forces of the thermoplastic material. Typically, vacuum was also applied through ports 35, 37 which connected the mandrel working surface with a vacuum source (not shown).

In the final step of the prior art process, the pipe socket end 33 is cooled by means of a water spray bar 39 and spray nozzles 41. As the cooling takes place, the pipe socket end 33 shrinks around the gasket 11, thus compressing the rubber body of the gasket between the steel reinforcing ring 13 and the socket-groove to establish a firm seal.

The above described Rieber process has been in commercial use since the early 1970's and is described in the above referenced issued United States patents, among other sources. It will thus be well familiar to those skilled in the thermoplastic pipe sealing arts.

Applicant's restraining mechanism and self-restrained gasket system differs from the above described Rieber process in that the restraining system of the invention is comprised of two distinct components, rather than a single elastomeric component. The components of the restraining system of the invention are shown in greater detail in the cross sectional view of FIGS. 2A and 2B. The first component is an elastomeric sealing member 14. The annular sealing portion 16 is somewhat tear drop shaped in cross section and includes a bulbous end region 28 (FIG. 2B) and a thinner forward most region 30. The sealing portion 16 also has an exposed exterior region (generally at 32) which contacts the exterior surface 24 of the mating male pipe section upon assembly of the joint. The sealing member is preferably made of a resilient thermoplastic material. The sealing member can be formed, for example, from natural or synthetic rubber, such as SBR, or other elastomeric materials which will be familiar to those skilled in the plastic pipe arts such as EPDM or nitrile rubber.

Figure 14:
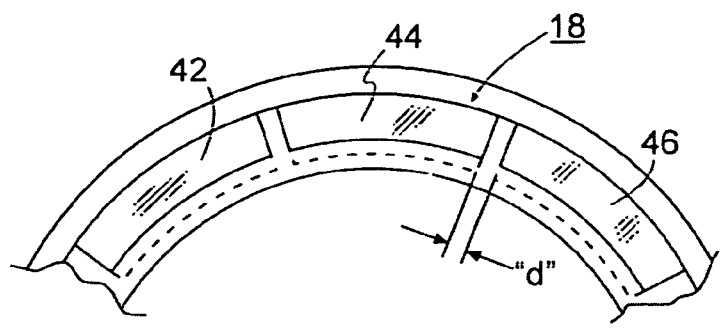
FIG. 14 is a simplified, top view of one version of the restraining mechanism of the invention, showing a plurality of toothed ring segments which make up the gripper ring.
Figure 15:
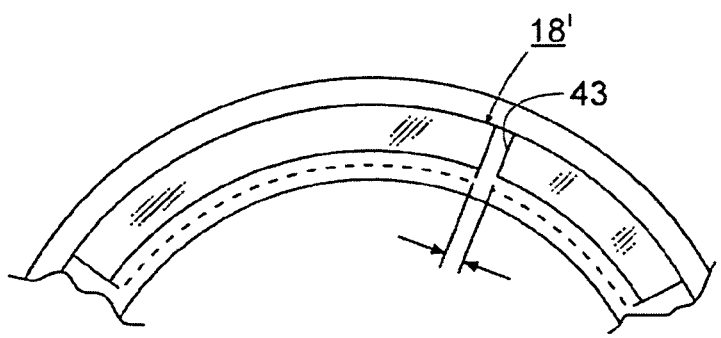
FIG. 15 is a view similar to FIG. 14, but showing another version of the restraining mechanism of the invention in which a solid gripper ring with one slit in the circumference is utilized.

The version of the restraining mechanism of the invention illustrated in FIGS. 1, 2A and 2B also includes a relatively rigid gripper ring (18 in FIG. 2A) which is molded or incorporated within or otherwise a fixed to the elastomeric sealing ring portion 16 in FIGS. 2A and 2B. As best seen in FIGS. 14 and 15, the gripper ring can be comprised of a plurality of segments (42, 44, 46), or can be comprised of a solid ring 18 which is slit at only one point in the circumference. Each segment of the rigid annular ring 18 shown in FIG. 2 is generally triangular shaped in cross section and includes an exposed lower surface 34 which carries one or more rows of gripping teeth 36, 38. By "relatively rigid" is meant that the ring segments 18 can be formed of a hard metal, such as corrosion resistant stainless steel, or from other metallic materials or alloys or even a hardened plastic or composite. As best seen in FIG. 2, the rows of teeth 36, 38 which extend from the ring inner circumference are arranged for engaging selected points on the exterior surface 24 of the mating male pipe section.

The rows of teeth 36, 38 on the lower surface 34 of the hardened ring segments 18 can be of equal length or can be of odd lengths and can be arranged in either a uniform or non-uniform pattern about the inner circumference of the hardened ring. The teeth of the hardened ring are also angled away from the horizontal axis of the joint (40 in FIG. 2A) at an angle "α" of less than 90°.

FIGS. 1 and 2B also illustrate the make-up of a joint of plastic pipe in which the male spigot end 20 is inserted within the belled female pipe section 10. FIG. 2B illustrates the gripping action of the rows of teeth 36, 38 of the hardened ring segments 18 in which the teeth 36, 38 grip the exterior surface 24 of the male pipe section 18. The rows of teeth 36, 36 are angled inwardly with respect to the axis 40 so that contact with the male pipe end (20 in FIG. 2B) causes the teeth to be deflected in a counterclockwise direction with respect to axis 40 during the insertion step, as viewed in FIG. 2B. Once the male pipe section 18 has been fully inserted, the rows of teeth 36, 38 grip the exterior surface of the male pipe and resist movement in an opposite longitudinal direction.

As briefly mentioned and as further illustrated in FIGS. 14 and 15, the hardened, segmented ring portion of the gasket can be comprised of a plurality of arc-shaped segments (such as segments 42, 44, 46) which are arranged in circumferential fashion about the elastomeric sealing portion 16 of the gasket. In one preferred form of the invention for a 6.90 inch O.D. pipe, there are six segments arranged in circumferential fashion about the gasket periphery although this number could vary depending upon the pipe diameter and other factors. Each of the segments is separated by a gap ("d" in FIG. 14) when the gasket is in the relaxed state shown in FIG. 7. When the joint is assembled, the gaps close up, allowing near or compete 360° contact of the gripping segments about the periphery of the gasket. This contact prevents the hoop stress that might otherwise cause shearing or damage to the male pipe section as the gripping teeth bite into the exterior surface 24 of the male pipe section.

The gap or gaps ("d" in FIG. 14) prevent the teeth of the gripping segments from engaging the outer surface of the male plastic pipe prematurely, i.e., until the gasket has been compressed enough to create the seal. As a result, the pipe seal is made before the teeth of the gripping segments contact the male pipe outer surface. As can also perhaps best be appreciated from FIG. 2B, the elastomeric sealing portion 16 of the gasket also helps to load the gripping segments 18, exerting a downward force on the gripping segments, thereby assisting the gripping action of the teeth into the exterior surface of the male pipe.

As illustrated in FIG. 15, the gripper ring can also comprise a solid, one piece ring with only one slit or opening 43 provided therein. In this case, the gripper ring 18' might be located in a "pocket" provided in the elastomeric body of the sealing ring portion of the restraint mechanism to allow some freedom of movement of the gripper ring as the pipe joint is made up.

As best seen in FIG. 2A, where a plurality of ring segments are utilized, the hardened segments 18 are joined to the elastomeric sealing portion 16 of the gasket along a mating surface 48. The elastomeric sealing portion 16 and the hardened gripping ring portion 18 can conveniently be joined by molding in a suitable fixture. Alternatively, the component parts of the gasket can be joined by use of a suitable adhesive or bonding agent. Note that the opposing end regions of the ring segments (illustrated at 50 in FIG. 2A) are not typically bonded to the rubber in order to allow the ring segments some freedom of movement during the pipe assembly process.

Figure 7:
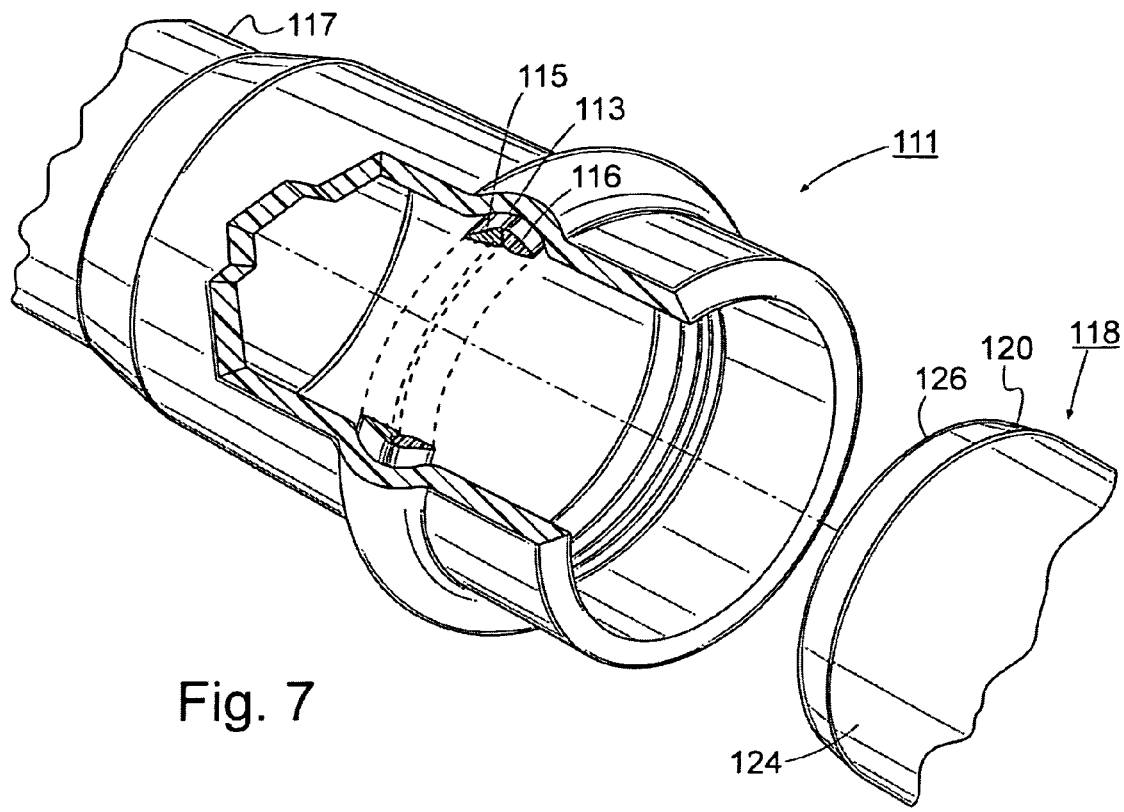
FIG. 7 is an exploded view, similar to FIG. 1, of another version of the restraining mechanism of the invention showing separate sealing and gripper members in the mating groove provided in the female, belled pipe end.
Figure 8:
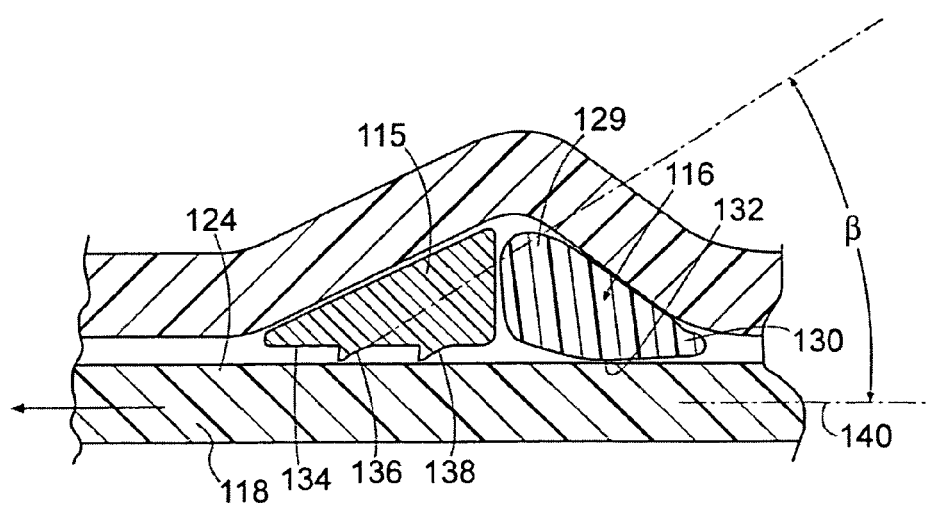
FIG. 8 is a view similar to FIG. 2A, showing the restraining mechanism in greater detail.

Turning now to FIGS. 7 and 8, another embodiment of the restraining mechanism of the invention is illustrated. Turning first to FIG. 7, there is shown an exploded view of a plastic pipe joint in which a belled female pipe end 111 is provided with an annular groove 113 for receiving the components of the self-restraining system of the invention. The restraint system of the invention can be any system formed integrally with the belled pipe end which acts not only to seal, but also to restrain the male pipe from longitudinal movement relative to the female pipe once the joint is made up in the field. Typically, the restraint system will comprise a rubber or elastomeric sealing ring which is provided with cooperating gripping or locking devices which may be integral with the sealing ring or separate therefrom. The locking devices might be hardened ring segments provided with teeth. Alternatively, the locking device might be a single relatively rigid ring with gripping teeth with the ring being slit at one point in its periphery.

As shown in FIGS. 7 and 8, a relatively rigid annular gripper ring 115 and a companion elastomeric type sealing ring 116 are factory installed within the female belled end opening of the female plastic pipe 117. The components of the restraint joint of the invention are capable of joining and sealing the female plastic pipe 117 to a mating male plastic pipe section 118 having a spigot end 120 and having an exterior surface 124 and an interior surface 126. The plastic pipe 117 can be made from any convenient synthetic material including polyvinyl chloride and the polyolefins such as polyethylene and polypropylene but is preferably made from polyvinyl chloride (PVC).

The components of the self-restrained joint of the invention are shown in greater detail in the cross sectional view of FIG. 8. The annular sealing ring 116 is somewhat tear drop shaped in cross section and includes a bulbous end region 128 and a thinner forward most region 130. The sealing ring or gasket 116 also has an exposed exterior region 132 which contacts the exterior surface 124 of the mating male pipe section upon assembly of the joint. The sealing ring body is preferably made of a resilient thermoplastic material. The sealing ring body 117 can be formed, for example, from natural or synthetic rubber or other elastomeric materials which will be familiar to those skilled in the plastic pipe arts such as EPDM or nitrile rubber.

In the embodiment illustrated, the self-restrained joint of the invention also includes a relatively rigid gripper ring 115 as a companion to the resilient sealing ring 116. The hard annular ring 115 shown in FIG. 8 is generally triangular shaped in cross section and includes an exposed lower surface 134 which carries one or more rows of gripping teeth 136, 138. The ring is slit at one circumferential position on the periphery thereof. The gripper ring 115 can be formed of a corrosion resistant metal such as stainless steel but could also be other metallic materials or alloys or even a hardened plastic or composite. As best seen in FIG. 8, the rows of teeth 136, 138 which extend from the ring inner circumference are arranged for engaging selected points on the exterior surface 124 of the mating male pipe section.

FIG. 8 illustrates the make-up of a joint of plastic pipe in which the male spigot end 118 is inserted within the belled female pipe section 111. FIG. 8 illustrates the gripping action of the rows of teeth 136, 138 of the gripper ring 115 in which the teeth 136, 138 grip the exterior surface 124 of the male pipe section 118. The rows of teeth 136, 136 are angled inwardly with respect to the axis 140 so that contact with the male pipe end (118 in FIG. 8) causes the teeth to be deflected in a clockwise direction with respect to axis 40 during the insertion step. Once the male pipe section 118 has been fully inserted, the rows of teeth 136, 138 grip the exterior surface of the male pipe and resist movement in an opposite longitudinal direction.

Because the restraint system of the invention utilizes two components, namely the sealing ring and the rigid gripper ring, the sealing ring can actually serve to pre-load or energize the gripper ring so that the ring is more firmly engaged on the exterior surface of the male pipe section. This can be accomplished, for example, by intentionally providing an excess amount of rubber in the sealing ring so that the sealing ring bears against the gripper ring and intentionally increases the insertion force required to make up the pipe joint.

Figure 9:
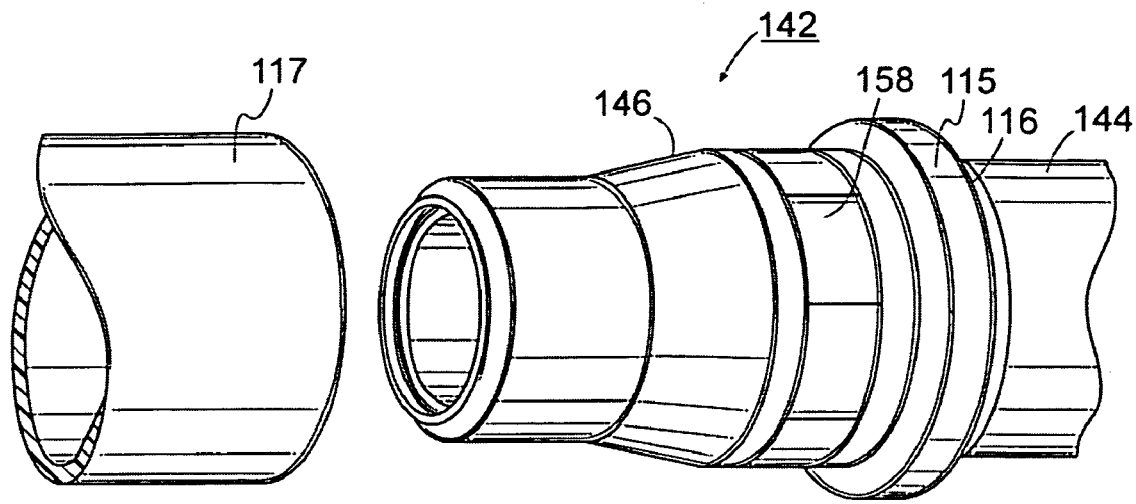
FIGS. 9-11 are simplified, partly schematic views of one version of the manufacturing method of the invention, in which a mandrel with a ramp surface is used to bell the female pipe end.
Figure 10:
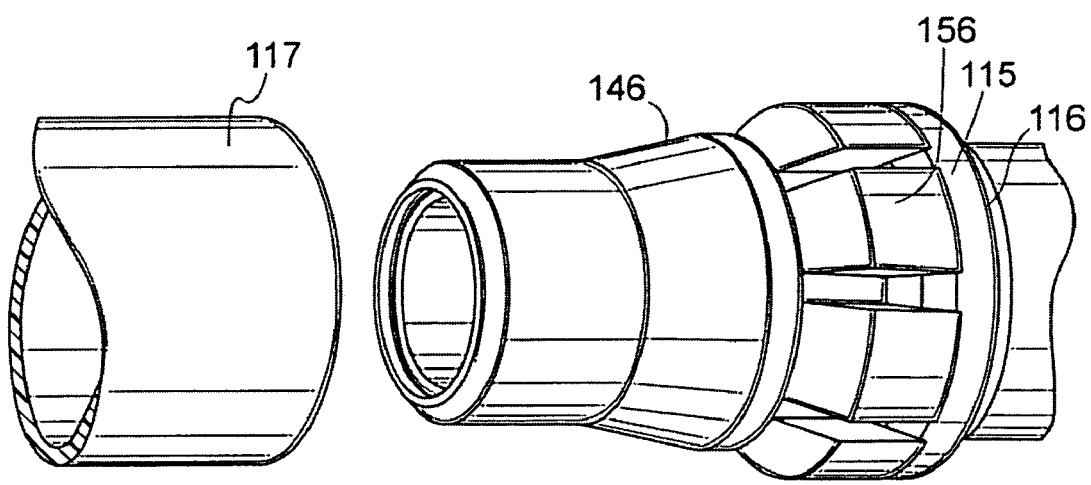
Figure 11:
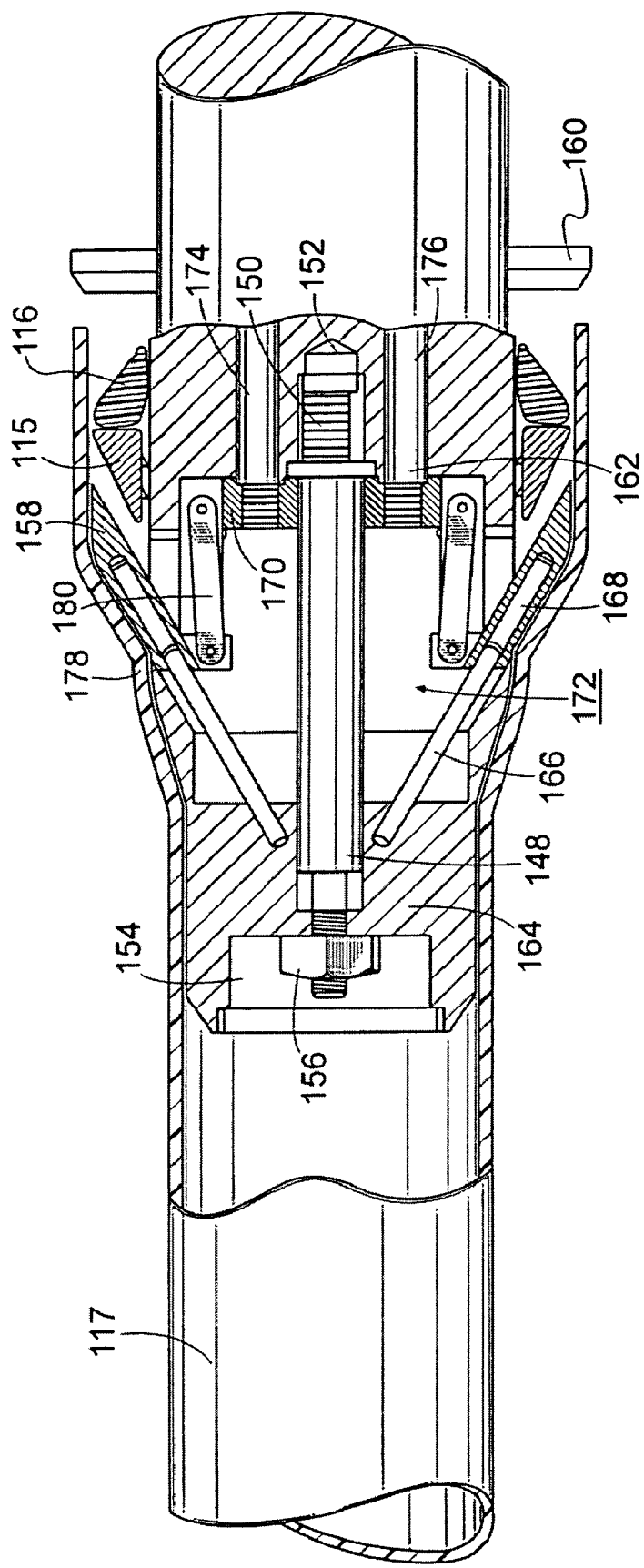

The method of installing the components of the restraining system of the invention will now be described. Because the restraining system of the invention includes two component parts, namely a resilient sealing ring and an annular gripper ring, certain problems are introduced into the traditional "Rieber style" manufacturing process. The presence of the rigid ring component necessitates that some special design features be incorporated into the forming mandrel. FIGS. 9-11 illustrate a "ramp" type apparatus which can be used to install the components of the restraining system of the invention in a "Rieber like" fashion. Referring first to FIG. 9, there is illustrated a mandrel 142 which comprises generally a cylindrical body portion 144 and a shaped profile or nose portion 146. As best seen in FIG. 11, a guide rod 148 is provided in longitudinal alignment within the mandrel and has a threaded end 150 threadedly secured within the threaded opening 152. The forward end of the guide rod 148 terminates within the profile forward cavity 154 and is secured therein by employing a conventional nut 156.

The mandrel profile 146 is equipped with a plurality of similar expanding segments 158. These segments allow the heated pipe end 117 to be forced over the relatively rigid ring 115 and sealing ring 116 which have been manually or automatically positioned on the mandrel. The plurality of segments 158 are reciprocal between their respective contracted positions and of their respective expanded positions as illustrated in FIGS. 10 and 11. In the contracted position, the segments are circularly juxaposed and form a complete, cylindrical portion of the mandrel shaped profile or nose. In their respective expanded positions, the plurality of segments 158 are urged radially outwardly and rearwardly to define a circular outer periphery of diameter greater than the outer diameter of the gasket 116 or hardened ring 115 whereby the heated pipe end 117 can be easily forced over the gasket 116 and gripper ring 115 at the initiation of the pipe belling operation. Preferably, the segments form forwardly inclined ramp regions to facilitate expanding the heated pipe end sufficiently to clear the gasket and hardened ring as the pipe is axially moved to contact the stop ring (160 in FIG. 11).

Referring now particularly to FIG. 11, it will be observed that a plurality of radially outwardly and rearwardly positioned guide dowels 162 are equally, circularly spaced about the guide rod 148 and are securely seated within the forward nose block 164. One such guide dowel 166 is provided for each of the expanding segments 158 whereby each expanding segment 158 will travel longitudinally along its respective guide dowel 166 when the segments are reciprocated between their contracted and expanded positions. Each segment 158 is provided with an elongated dowel opening 168 of suitable size and configuration to facilitate sliding engagement of each segment 158 upon its associated guide dowel 166.

An operating plate 170 is reciprocal within an operating cavity 172 provided between the mandrel body and the mandrel nose. The operating plate 170 is formed with a concentric guide opening to provide a sliding engagement between the operating plate 170 and a bearing portion of the guide rod 148. One or more operating rods 174, 176 may be reciprocated through the mandrel body 116.

Each of the expanding segments 158 has a radially inward portion equipped with a pivot bracket 178, which bracket is exposed within the mandrel cavity 172. Individual links 180 connect each pivot bracket 178 with a peripheral portion of the operating plate 170. Forward and rearward pivot pins pivotally connect each link 180 respectively with an expanding segment bracket 178 and the operating plate 170 in pivotal connections.

As a result, when the operating rods 174, 176 are activated to push the operating plate 170 forwardly, the plurality of interconnecting links 180 will function to push the segments radially inwardly and forwardly along the associated guide dowels 166. In this position, the outer peripheries of the expanding segments 158 will be pulled into circular alignment whereby adjacent portions of the adjacent expanding segments 158 contact each other and the diameter of the outer circular periphery defined by the segments 158 is equal to the diameter of the outer periphery of the mandrel body 144. In this position, the maximum diameter of the outer periphery of the gasket and gripper ring will be greater that the contracted diameter of the circle defined by the expanding segments 158.

When the operating rods 174, 176 are reciprocated to the right to thereby pull the operating plate 170 to its rearward position, the plurality of links 180, functioning through the plurality of forward and rearward pivot pins serve to pull each of the segments 158 respectively radially outwardly and rearwardly by sliding along the plurality of guide dowels 166 to their expanded positions. When the segments 158 are pulled to their respective expanded positions 172, the segments 138 will define a circular periphery that is greater in diameter than the diameter of the outer periphery of the gasket and hardened gripper ring. With the segments remaining in their expanded position, the heated end 117 of the pipe can be applied over the mandrel shaped profile 146 and over the outer periphery of the segments 158. The forward end of the heated pipe portion 117 will expand over the forward slopes of the segments and will stop against the stop ring 160.

The above description of a "ramp" style installation of the components of the restraining joint of the invention follow the description given in issued U.S. Pat. No. 4,643,658, and others. FIGS. 12 and 13 illustrate an alternative installation operation in which a working mandrel having collapsible elements 182 initially supports the ring components 115, 116. After the heated pipe end is forced over the mandrel and expanded over the ring components 115, 116, the pipe end is cooled. The mandrel elements are collapsed inwardly by means of the actuating mechanism 184 and the mandrel is then removed from the pipe. FIG. 13 illustrates the inward and outward movement of the mandrel elements 182 in schematic fashion.

The present invention thus departs from the teaching of the above Rieber patents in that the pipe joints of the invention incorporate a restraining mechanism which includes both a sealing member and a gripper member. However, as in the Rieber manufacturing process described above, the preferred restraining mechanism of the invention is integrally belled in the female pipe end during manufacture of the bell end. Thus, the restraining mechanism of the invention can be installed and prelocated within a mating pipe groove in the "Rieber style", with the exception that it may be necessary to use a "collapsible mandrel" or a "ramp" style mandrel to accommodate the hard, relatively rigid ring or ring segments which are positioned on the exterior of the forming mandrel.

Figure 16:
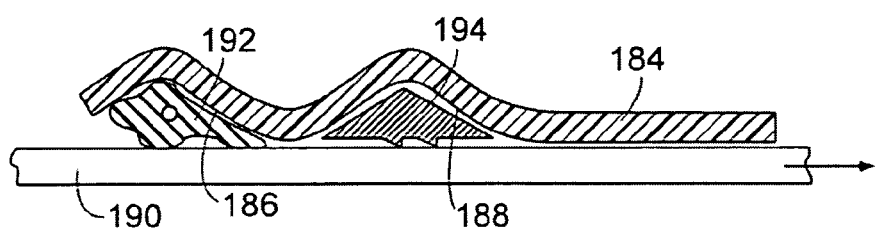
FIGS. 16-18 are all simplified, schematic views of a belling process of the invention in which two separate internal grooves are belled within the female pipe end, the separate grooves being used to contain components of the sealing and restraining mechanism of the invention.
Figure 17:
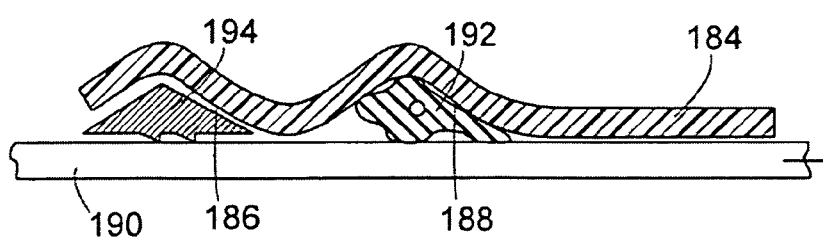
Figure 18:
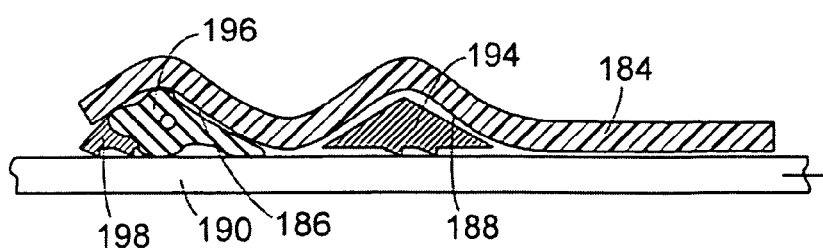

While the invention has been described with reference to a single internal groove formed within the female bell pipe end, it will be understood that two or more grooves can be formed in the bell pipe end, either mechanically at the factory prior to installing the restraining system components, or in the Rieber fashion so that the grooves are simultaneously formed about the restraining system positioned on the forming mandrel. With reference to FIGS. 16-18, there is shown a pipe connection in which the female bell pipe end 184 has a pair of spaced internal grooves 186, 188 formed therein. The female bell pipe end 184 receives a mating male spigot pipe end 190 to form a secure connection or joint. In FIG. 15, the first groove 186 is formed about a sealing ring component 192 and the second groove 188 is formed about a gripper ring component 194. In FIG. 16, the position of the sealing ring component 192 and the gripper ring component 194 is reversed. FIG. 18 shows one additional alternate embodiment of the restraining system of the invention in which a gripper ring 194 in one groove is paired with a combined sealing/gripper ring 196 in the other internal groove. Each of the above style bell pipe ends can be manufactured using the forming mandrels previously described by providing an additional work location for the additional component.

An invention has been provided with several advantages. The present invention provides a sealing and restraint system in which the restraint mechanism is integral to the groove formed in the bell end opening of a female pipe member. The restraining mechanism may be provided as a part of a "gasket formed" bell groove, as in a Rieber style pipe belling operation where the groove is simultaneously formed as the bell pipe end is formed. Alternatively, in another embodiment, the restraining mechanism may be provided as a part of a "mechanically formed" bell groove in which the bell groove is formed beforehand at a manufacturing plant on a mandrel and the restraining mechanism is thereafter inserted into the bell groove, for example, at a field location. In its most preferred form, the manufacturing method and device of the invention provide an improved restraint system for plastic pipe joints utilizing the "gasket formed" bell groove, which does not require assembly in the field and which thus simplifies installation of pipe sections at the pipe joints used to form a fluid conveying pipeline, thereby reducing the chance of human error or of damage or contamination of the gasket sealing surfaces.

The integral restraint system of the invention eliminates the need for an external clamping device of the type presently used in the industry to achieve the restraining function, which device is totally separated from the sealing function. The system of the invention is also simple in design, dependable in operation, and is less costly to manufacture than the prior art restraining systems which utilize external glands and mechanical restraint components.

Because the ring components of the restraint system of the invention are pre-installed, the possibility of mistakes during field assembly is virtually eliminated. Also, the gripper ring component of the invention applies more pressure to the exterior surface of the mating male spigot pipe end as internal pressure builds within the fluid coupling. This action helps to ensure the integrity of the joint. In addition, the gripper ring component aids in sealing the joint by keeping a constant gripping pressure on the male pipe end at even the lowest operating pressures of the pipeline.

Two additional aspects of the gripper ring component of the restraint system of the invention are also important. The first aspect concerns the fact that the sloping upper surface region (52 in FIG. 2A) forms a natural "ramp" surface to facilitate movement of the heated female pipe end over the gasket during the pipe belling process, as described with reference to FIGS. 3-6 of the drawings. Also, in a second aspect, the inclined surfaces 52 of the gripper ring component contact the inclined internal surfaces 54 of the inside diameter of the female pipe socket or pipe groove (as shown in FIG. 2A) after manufacture. During the insertion of the male pipe, the outside diameter of the male pipe is larger than the inside diameter of the gripper ring. This causes the gripper ring component or components as well as the sealing ring body to expand slightly. The outside inclined surfaces 52 of the hardened ring segment portion of the gasket slide along the mating surface of the inclined internal surfaces 54 of the inside diameter of the female pipe socket or pipe groove. As the force or internal pressure builds, the pipe tries to push outward of the belled socket. This action causes the gripper ring outside surfaces 52 to slide against the inside pipe groove surface in a downward motion. The "gap or gaps" in the gripper ring are brought closer together or completely close. This combination of actions serves not only to restrain the pipe but prevents stress on the pipe wall circumferentially.

In those cases where the gripper ring is totally separate from the sealing ring component, as in FIGS. 7 and 8, the action of inserting the male pipe end 118 compresses the sealing ring component 116. The sealing ring component, in turn, exerts a "load" on the companion gripper ring 115. By intentionally providing an excess of rubber in the sealing ring component 116, the gripper ring 115 can be "energized" during the make up of the pipe joint.

While the invention has been shown in several of its forms, it is not thus limited but is susceptible to various changes and modifications without departing from the spirit thereof.

What is claimed is:

1. An integral bell, pipe-to-pipe restraint system capable of both joining and sealing a female belled plastic pipe to a mating male plastic pipe having an interior surface and an exterior surface, the restraint system comprising:
   a formed-in-place sealing ring comprising a circumferential elastomeric body, the sealing ring being integrally pre-installed within a groove formed in a belled end of the female pipe as a part of a belling operation during manufacture of the belled end of the female pipe;
   a separate formed-in-place companion gripper mechanism for the elastomeric sealing ring which allows movement of the mating male pipe relative to the female belled end opening in a first longitudinal direction but which restrains movement in a second, opposite relative direction, the companion gripper mechanism also being pre-installed within the groove formed in the belled end of the female pipe as apart of a belling operation during manufacture of the belled end of the female pipe, the separate companion gripper mechanism comprising a rigid metal ring with gripping teeth, the metal ring being slit at one point in the periphery thereof; and
   wherein the sealing ring is intentionally provided with an excess of elastomeric material over and above that which would be necessary for establishing a seal with the mating male pipe under existing pressure conditions, the excess material serving to energize the action of the separate gripper ring in engaging the external surface of the male pipe.

2. The restraint system of claim 1, wherein the plastic pipe is made of PVC.

3. The restraint system of claim 1, wherein the sealing ring is formed from a material selected from the group consisting of natural and synthetic rubbers and elastomers, polymeric plastics and composites.

4. A pipe-to-pipe restraint system capable of both joining and sealing an integrally belled female plastic pipe end to a mating plain end male plastic pipe having an interior surface and an exterior surface, the restraint system comprising:
   a separate, relatively rigid formed-in-place gripper ring having an inner circumference and an outer circumference, the gripper ring being received within a mating groove provided within the belled end of the female plastic pipe, the gripper ring being pre-installed within the mating groove as a part of a belling operation during manufacture of the belled end of the female pipe, the separate gripper ring comprising a rigid metal ring with gripping teeth, the metal ring being slit at one point in the periphery thereof;

a companion, separate formed-in-place annular sealing ring made of a resilient elastomeric material, the sealing ring being received beside the gripper ring within the mating groove provided within the belled end of the female plastic pipe, the companion sealing ring also being pre-installed within the groove formed in the belled end of the female pipe as a part of a belling operation during manufacture of the belled end of the female pipe;

wherein the gripper ring gripping teeth extend from an inner circumference thereof for engaging selected points on the exterior surface of the mating male plastic pipe; and wherein the mating groove provided in the belled end of the female plastic pipe, which receives the gripper ring and sealing ring, forms a smooth sloping arcuate shape when viewed in cross section.

* * * * *